United States Patent [19]

Donon

[11] 4,145,565
[45] Mar. 20, 1979

[54] DEVICE FOR MAINTAINING A SEPARATION BETWEEN TWO ELECTRIC CONDUCTORS

[75] Inventor: Jerome Donon, Paris, France

[73] Assignee: Compagnie General d'Electricite S.A., Paris, France

[21] Appl. No.: 701,915

[22] Filed: Jul. 1, 1976

[30] Foreign Application Priority Data

Jul. 22, 1975 [FR] France ................. 75 22866

[51] Int. Cl.² .............................................. H01B 9/04
[52] U.S. Cl. ..................................... 174/28; 174/16 B
[58] Field of Search ................ 174/16 B, 111, 28, 29, 174/256, 99 B

[56] References Cited

U.S. PATENT DOCUMENTS

| | | | |
|---|---|---|---|
| 2,623,122 | 12/1952 | Weber et al. | 174/28 X |
| 3,188,587 | 6/1965 | Huber et al. | 174/28 X |
| 3,372,226 | 3/1968 | Sewell | 174/28 X |
| 3,735,016 | 5/1973 | Spinner | 174/28 |
| 3,760,306 | 9/1973 | Spinner et al. | 174/16 B UX |
| 3,809,795 | 5/1974 | Olsen | 174/28 |
| 3,906,149 | 9/1975 | Hashoff et al. | 174/28 X |
| 3,911,197 | 10/1975 | Kruger | 174/28 |

FOREIGN PATENT DOCUMENTS

| | | | |
|---|---|---|---|
| 397081 | 8/1933 | United Kingdom | 174/28 |
| 1133270 | 11/1968 | United Kingdom | 174/28 |
| 1395221 | 5/1975 | United Kingdom | 174/28 |

*Primary Examiner*—Arthur T. Grimley
*Attorney, Agent, or Firm*—Sughrue, Rothwell, Mion, Zinn and Macpeak

[57] ABSTRACT

This invention concerns a device for maintaining a separation between two electric conductors. A dielectric spacer comprises, in the vicinity of at least one conductor, a portion having high permittivity. Application to the increase in the voltages which coaxial electric power conveying cables can withstand.

7 Claims, 5 Drawing Figures

DEVICE FOR MAINTAINING A SEPARATION BETWEEN TWO ELECTRIC CONDUCTORS

BACKGROUND OF THE INVENTION

1. Field of the Invention

The present invention relates to a device for maintaining the spacing between two electric conductors. It applies particularly, but not exclusively, to high-voltage coaxial cables having a fluid dielectric, in which the inner conductor must be kept on the axis of the outer conductor.

2. Description of the Prior Art

It is known that to increase the electric power conveyed by such a cable, the voltage between conductors may be increased, but that this possibility is limited by the risks of electric breakdown and the necessity of limiting the diameter of the cable.

A solid dielectric spacer disposed between two adjacent surfaces of the conductors is known for maintaining the distance between two conductors between which a voltage is to be applied. It may be noted that the electric field corresponding to the voltage applied appears between these two conductive surfaces and that the risks of electric breakdown are connected exclusively with the shape and with relative disposition of these surfaces and not with the general structure of these conductors. Moreover, some parts of the conductive surfaces to be taken into consideration can be constituted for example by thin metal sheets which are in electrical contact with the conductors, but which are mechanically distinct therefrom.

To facilitate the description of known arrangements, it may be assumed that in a first phase, the two conductive surfaces are plane, parallel and horizontal and that the remainder of the gap between these two surfaces is a vacuum or filled with a dielectric fluid which is gaseous, for example. As for the spacer, it can be in the shape of a prism or of a cylinder having vertical generator lines, two of whose opposite horizontal faces are in contact with the conductive surfaces and whose vertical side faces are in contact with the gaseous dielectric and constitute therefore an interface between the solid dielectric and the gaseous dielectric. The equipotential surfaces are then horizontal planes and the electric field is even and vertical. If the distance between the conductive surfaces is fixed and if it is sought to increase as much as possible the electric voltage applied between these surfaces, possibilities are limited by a breakdown which causes an electric arc between these surfaces. This breakdown occurs at a point in the solid or gaseous dielectric where the electric field is stronger than the dielectric. A spacer could be considered perfect if, when the electric voltage is applied progressively, the "local breakdown voltage" i.e. the value of the voltage applied which causes a breakdown in this spacer or in the immediate vicinity thereof, was at least equal to the "general breakdown voltage", i.e. at the value of the voltage applied which causes a breakdown in the gaseous dielectric at a distance from the spacer.

Unfortunately, this is not the case; it is sufficient to apply a voltage which is very much lower than the breakdown voltage in the gas in order to cause breakdown in the "triple interface" zone, i.e. at a point situated on the side faces of the spacer in the immediate vicinity of one of the conductive surfaces.

To palliate this disadvantage, a known solution consists in reducing greatly the electric field at the triple interface by effecting what will be called hereinafter an "embedding" of the spacer in the conductor, i.e. by curving the conductive surface progressively under either side of the spacer so that it is further from the other conductive surface in the vicinity of the spacer. A hollow or recess is thus formed for example in the lower conductive surface. The spacer is pressed against the bottom of the recess so the length of the spacer must evidently be increased by the depth of recess. The edges of this recess are rounded with a convexity directed upwards towards the spacer. Their furthest part from the spacer is connected tangentially to the remainder of the horizontal conductive surface. Their nearest part to the spacer is vertical and is connected at right-angles to the bottom of the recess along a line of a ridge. The spacer occupies the whole of the bottom of the recess, so that the ridge line constitutes the previously mentioned triple interface. The depth of the recess which has just been mentioned will be called hereinafter the "embedding depth".

The embedding which has just been described results in a great reduction of the electric field in the triple interface zone, this removing the risk of breakdown in this zone. It is known indeed that at the joining of two perpendicular conductive surfaces, the electric field is zero. But the local breakdown voltage nevertheless remains appreciably lower than the general breakdown voltage. Indeed, if the applied voltage is increased, a breakdown occurs in the gaseous dielectric in an intermediate part of the convex edge of the previously defined recess or at the surface of the spacer in the vicinity of this intermediate part of the edge. This breakdown is due to the fact that the electric field is reinforced in the vicinity of the convexity of a conductive surface.

Preferred embodiments of the present invention aim to increase the previously defined local breakdown voltage.

SUMMARY OF THE INVENTION

The present invention provides a device for maintaining the separation between two electric conductors, comprising:
 - A dielectric spacer disposed between a first bearing zone and a second bearing zone which are mechanically and electrically continuous respectively with the two conductors;
 - These first and second bearing zones constituting respectively parts of a first conductive surface and second conductive surface which are electrically continuous with the two conductors and which are adjacent to each other so that when a voltage is applied between these conductors a corresponding electric field is set up throughout the whole space between these two conductive surfaces;
 - At least the recess first bearing zone being disposed at the bottom of a recess in the said first conductive surface, so that this bearing zone is further away from the second conductive surface than the remainder of this first conductive surface, the edges of this recess being connected progressively with the remainder of this first conductive surface by a curved part, this forming an "embedding" of the spacer in this conductive surface, the spacer having a higher permittivity in the vicinity of the said first bearing zone that it has further away from said first bearing zone.

Three embodiments of the invention will be described hereinbelow by way of an example with reference to the accompanying drawings.

BRIEF DESCRIPTION OF THE DRAWINGS

The elements which are common to several figures, have the same reference numerals in each figure.

DESCRIPTION OF PREFERRED EMBODIMENTS

Figure 1:
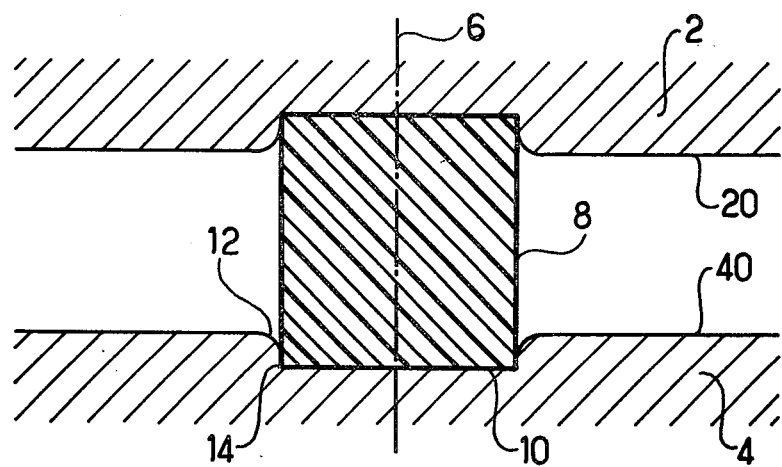
FIG. 1 is a cross-section view of a known device.

The device shown in FIG. 1 makes it possible to maintain the distance between two plane horizontal conductive parts, namely, a top part 2 and a bottom part 4, having a symmetry of revolution about a vertical axis 6. The adjacent surfaces 20 and 40 of these two parts respectively constitute the upper and lower conductive surfaces previously mentioned. This device comprises an insulating spacer 8 having the shape of a cylinder of revolution about the axis 6. The two conductive surfaces are symmetrical to each other in relation to a horizontal plane passing through the middle of the spacer 8. This figure shows the known solution of "embedding" the spacer in the conductive parts. The conductive surface 40, for example, has a downwardly curved part all round the spacer 8 so as to form a hollow part or recess whose bottom 10 is plane and horizontal and constituted a bearing zone for the lower face of the spacer 8. The edge 12 of this hollow part is rounded off with a convexity directed upwards and towards the spacer 8. It is in the shape of a quarter of a toroidal surface, i.e. its shape in the plane of the cross-section is that of a quarter circle. Its part which is the furthest from the spacer is horizontal and is connected tangentially to the horizontal conductive surface of the electrode 4. Its part which is the nearest to the spacer 8 is vertical and is connected at right angles to the horizontal bottom 10 of the hollow part along a circle 14 constituting the previously mentioned triple interface.

Figure 2:
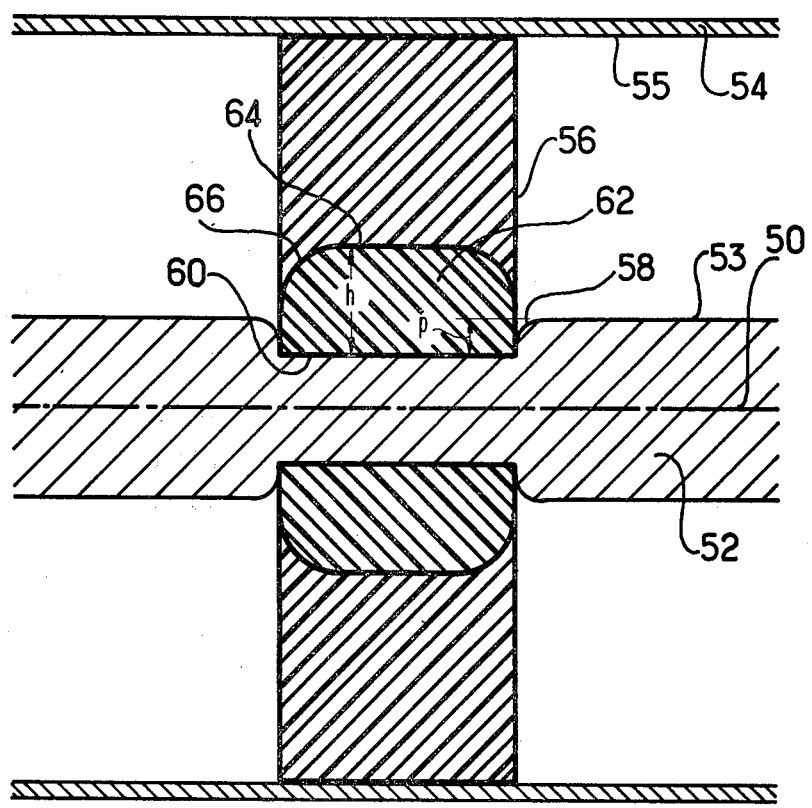
FIGS. 2, 3 and 4 are cross-sectional views of first, second and third embodiments of the present invention.
Figure 2A:
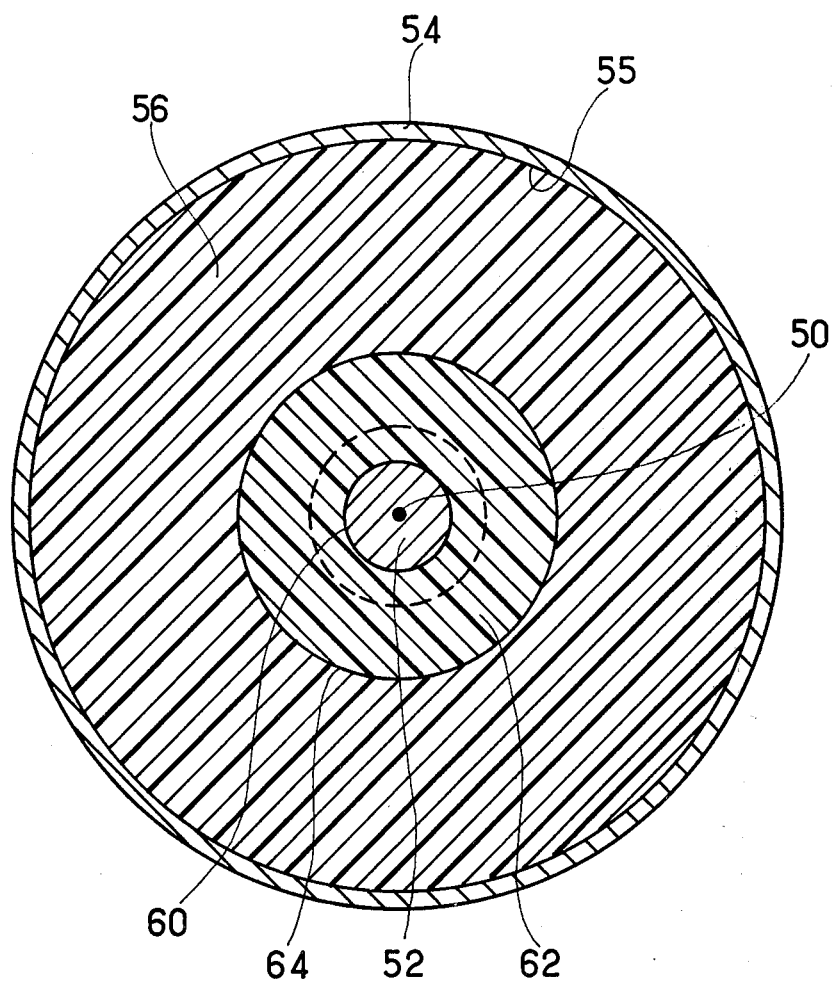
FIG. 2a is a vertical cross-section of the embodiment of FIG. 2 through the insulation spacer.
Figure 3:
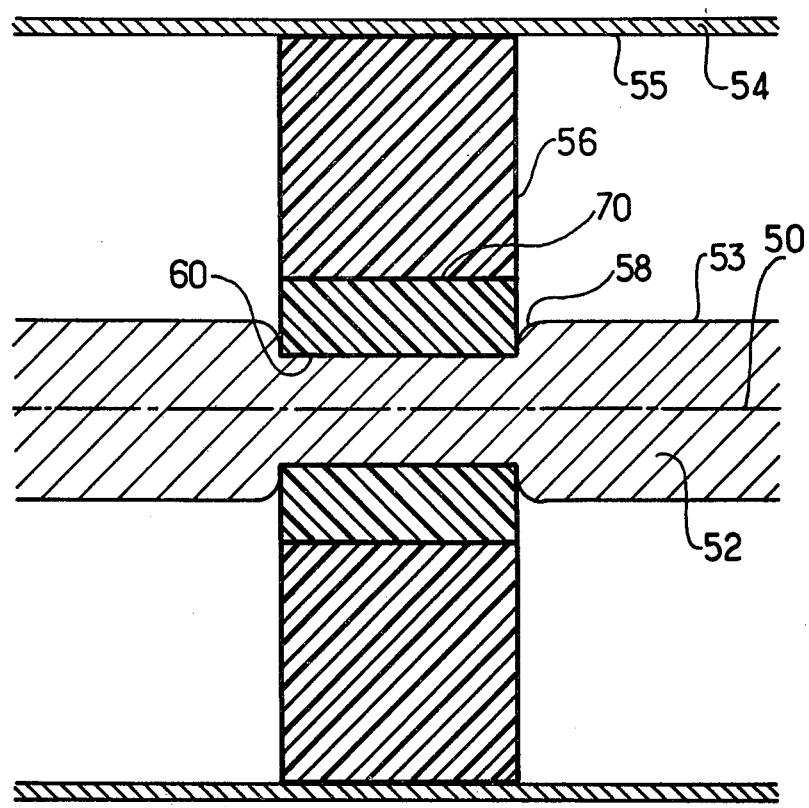

FIGS. 2 and 3 shows devices according to the invention applied to a coaxial cable whose axis is shown at 50 and which comprises an inner conductor 52 and an outer conductor 54 maintained at a distance from each other by a spacer 56 which has the general shape of a thick disk axially threaded by the inner conductor 52.

The outer wall of the spacer 56, in contact with the outer conductive surface 55 constituted by the inner face of the conductor 54, is covered with a layer of metal and forms a cylindrical surface, without embedding, for the electric field in a coaxial structure is relatively weak in the vicinity of the outer conductor. On the other hand, the inner wall of the spacer 56, in contact with the conductive surface 53 constituted by the surface of the conductor 52, is embedded in this conductor. The edge 58 of the embedding has rounded shoulders in the shape of a quarter of a torus of revolution about the axis 50. The bottom 60 of the embedding constitutes the first bearing zone previously mentioned. Its shape is that of a coaxial cylinder of revolution and forms a neck of smaller diameter of the main body of the conductor 52 at a distance from the spacer.

The spacer 56 includes, in the vicinity of the inner bearing zone 60, a part having high dielectric permittivity whose existence spreads the equipotential lines of the conductor 52 and thus prevents breakdown on the convexity of the edge 58 or, at the surface of the spacer 56, in the vicinity of this edge.

In the first embodiment shown in FIG. 2, this part having high permittivity, bearing the reference 62, takes up the whole thickness of the spacer 56 in the vicinity of the bearing zone 60. Its height h, i.e. the distance of its top 64 from the bearing zone 60 is preferably comprised between one and four times the depth p of the embedding. This top appears flat in the figure, i.e. it has, in actual fact, the shape of a cylinder of revolution about the axis 50. It is connected, at its two edges, with two side surfaces of the spacer 56 by two quarters of a torus 66 whose convexity is directed towards the outside of the spacer 56 towards the external conductor 54.

This top 64 and the two edges 66 constitute the interface between the part 62 having high permittivity and the remainder of the spacer 56, the connection being effected by gluing.

In the second embodiment shown in FIG. 3, the interface between the high permittivity part 70 and the remainder of the spacer 56 does not comprise rounded edges, i.e. it has, over its whole width, the shape of a cylinder. There results therefrom a greater simplicity of constructing the spacer, but also a great risk of concentration of the electric field in the vicinity of the edge of this interface. Such a disposition will therefore often be less favourable than that in FIG. 2.

Figure 4:
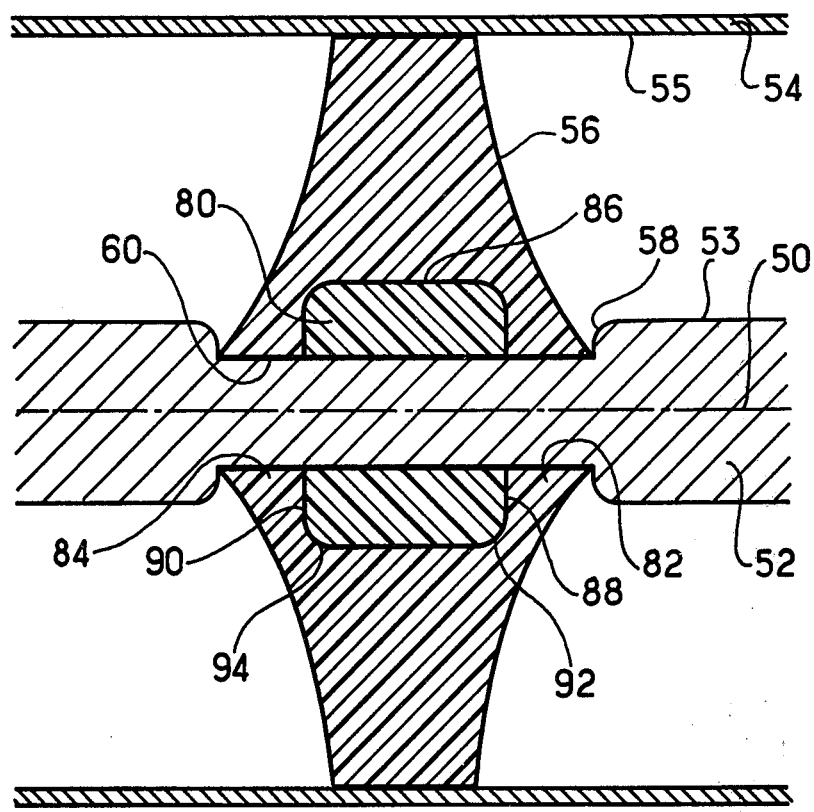

The third embodiment shown in FIG. 4 is analogous to that in FIG. 2, but the high permittivity part 80, while having the same general shape as the part 62 in FIG. 2, does not take up the whole thickness of the spacer 56, i.e. this high permittivity part does not reach the side surface of the spacer 56. It touches only the remainder of the spacer 56, i.e. the low permittivity part of this spacer and the central part of the bearing zone 60. The two edges of this bearing zone are in contact with two extensions 82 and 84 of the low permittivity part of the spacer. The high permittivity part 80 is disposed between these two extensions 82 and 84. These two extensions have the same thickness, measured parallel to the axis 50. The interface between the high permittivity part 80 and the remainder of the spacer 56 comprises a top 86 and two side surfaces 88 and 90.

The top 86 forms a cylinder of revolution about the axis 50 and constitutes the part of this interface which is the furthest from this axis.

The two side surfaces 88 and 90 constitute simultaneously the internal side surfaces of the extensions 82 and 84 respectively. These side surfaces are plane and have the shape of circular rings whose axis is the axis 50. Their inner surfaces touch the bearing zone 60. They are connected together by their outer circles to the edges of the top 86 by means of two quarter toruses 92 and 94 whose convexity is directed towards the outside of the spacer 56 and towards the outer conductor 54.

The third embodiment just described has the advantage that the side surface of the spacer 56 is homogeneous and is not interrupted by the interface between the high permittivity part and the remainder of the spacer. As the surface of the spacer constitutes a preferred path for possible electric arcs, the result of this is increased security with respect to breakdowns. To increase this security by lengthening the distance between the inner conductor 52 and the outer conductor 54 and to make the field more homogeneous, it can be an advantage to impart to this surface the shape shown, i.e. to make the thickness of this spacer decrease progressively, that distance being measured parallel to the axis 50 when going from the inner conductor 52 towards the outer conductor 54.

By way of indication, a few figures will be given concerning the first two embodiments of the invention previously described and the previously known disposition comprising a homogeneous spacer applied to a same coaxial conductor whose outer conductor 54 has an inside diameter of 120 mm and whose inner conductor 52 has an inside diameter of 20 mm. The depth of the embedding is $p = 5$ mm, i.e. the diameter of the bearing zone 60 is 10 mm. The small radius of the quarter torus 58 constituting the edge of the embedding is 5 mm.

In the first embodiment, the small radius r of the quarter torus 66 at the edge of the top of the high permittivity part 62 is 10 mm. Except for the spacer 54, the space is filled by sulphur hexafluoride $SF_6$ at a pressure of 3 bars, whose dielectric permittivity e1 is close to unity. It is known that dielectric permittivity is generally symbolized by the Greek letter epsilon. Here, the permittivity of the largest part of the spacer 56 will be called e2 and that of its high permittivity part will be called e3. The permittivity e3 is preferably higher than five times the permittivity e2.

The high permittivity part of the spacer 56 is made, for example, of polyethylene doped with barium titanate and the remainder of this spacer is made of polyethylene which is not doped or is doped with material having no effect on the permittivity but enabling the equalization of the coefficients of thermal expansion of the two parts of the spacer.

Figures will be shown for electric fields in the case where the outer conductor 54 is connected to earth and where the inner conductor is brought to a potential of 1000 V. These figures are those of the field EI on the inner conductive surface 53 at a distance from the spacer 56; of the field ER on the same conductive surface on the convex edge 58 of the embedding at the place where it is the largest; of the field ET on the lateral surface of the spacer 56 in the vicinity of the triple interface, i.e. more precisely the average figure of the field between the 1000 V potential point at the triple interface and the 950 V potential points; and lastly of the field EM on the same side surface of the spacer at the place where this field is the largest.

It must be understood that safety from breakdown is all the greater if these last three figures are low; more precisely, any reduction of the value EM increases the previously defined local breakdown voltage, at least for unfavourable surface states of the spacer 56.

Inasmuch as concerns the value ER, it is sufficient for it to be less than the figure EI to avoid any risk of premature breakdown on the edges of the embedding. This result can be obtained in the case of a coaxial cable but it could not be obtained in the case of plane parallel conductors shown in FIG. 1. The field figures are given in V/mm. Lastly the height h of the part of the high permittivity spacer 56, i.e. the distance from its top to the bearing zone 60 must be taken into consideration. This height is given in mm.

|    | Prior Disposition | First Embodiment | Second Embodiment |
|----|-------------------|------------------|-------------------|
| e1 | 1                 | 1                | 1                 |
| e2 | 2                 | 2                | 2                 |
| e3 | 2                 | 20               | 10                |
| EI | 56                | 56               | 56                |
| ER | 80                | 47               | 56                |
| ET | 23                | 14.4             | 15.5              |
| EM | 43                | 34               | 40                |
| h  | 0                 | 15               | 7.5               |

The first embodiment of the invention is apparent from the example chosen as better than the second, for it enables a lower value of EM. As for the previously known disposition, the value of ER shows effectively that when the voltage is made to rise between conductors, a breakdown occurs prematurely on the edges of the embedding.

The principle application of the invention is for use in coaxial cables and in particular for use with the inner conductor where the electric field is strongest. However, since the effect of the invention is to lower the electric field at the critical triple interface point, the invention is also of some use in the case of parallel plane conductors to reduce of the local electric field at both ends of the spacers.

What we claim is:

1. A device for maintaining the separation between two electric conductors, comprising:
    a dielectric spacer disposed between a first bearing zone and a second bearing zone which are mechanically and electrically continuous respectively with said two conductors;
    said first and second bearing zones constituting respectively parts of a first conductive surface and second conductive surface which are electrically continuous with said two conductors and which are adjacent to each other so that when a voltage is applied between these conductors a corresponding electric field is set up throughout the whole space between these two conductive surfaces;
    at least said first bearing zone being disposed at the bottom of a recess in said first conductive surface, so that this bearing zone is further away from said second conductive surface than the remainder of this first conductive surface, the edges of this recess being connected progressively with the remainder of this first conductive surface by a curved part to form an "embedding" of the spacer in this conductive surface, and said spacer having a high permittivity in the vicinity of said first bearing zone than it has further away from said first bearing zone.

2. A device according to claim 1, wherein the spacer has a part of homogeneous higher permittivity in the vicinity of the first bearing zone and a remaining part of homogeneous lower permittivity.

3. Device according to claim 2, wherein the height of the top of the said part having high permittivity above the said bearing zone comprises between one and four times the depth of the embedding.

4. Device according to claim 2, wherein said part having high permittivity has rounded edges.

5. Device according to claim 2, wherein said part having high permittivity is inside said spacer.

6. Device according to claim 2, wherein the permittivity of said high permittivity part is at least equal to 5 times that of the remainder of the said spacer.

7. A device according to claim 1, wherein the first conductor is the inner conductor of a coaxial cable and the second conductor is the outer conductor of said coaxial cable, the said first bearing zone being constituted by a neck in the inner conductor which is threaded through the spacer and which has rounded shoulders joining the neck to a main body of the inner conductor which is thicker than the neck on either side of the spacer thereby embedding the spacer in the inner conductor.

* * * * *